United States Patent [19]

Beier

[11] 4,006,644
[45] Feb. 8, 1977

[54] APPARATUS FOR TENSIONING A SAFETY BELT

[75] Inventor: Edmar Beier, Wolfsburg, Germany

[73] Assignee: Volkswagenwerk Aktiengesellschaft, Germany

[22] Filed: Jan. 21, 1976

[21] Appl. No.: 650,879

[30] Foreign Application Priority Data

Feb. 11, 1975 Germany .......................... 2505625

[52] U.S. Cl. ................. 74/242.1 FP; 74/242.14 R; 180/82 C; 280/744

[51] Int. Cl.² ...................... F16H 7/12; F16H 7/10; B60K 27/00; B60M 1/04

[58] Field of Search ................. 180/82 C; 242/75.3, 242/75.42, 75.41; 74/242.14 R, 242.1 FP, 424.5; 280/744, 746, 745, 747

[56] References Cited

UNITED STATES PATENTS

| | | |
|---|---|---|
| 3,836,168 | 9/1974 | Nonaka et al. ............... 180/82 C X |
| 3,881,667 | 5/1975 | Tandetzke ...................... 280/744 X |
| 3,912,035 | 10/1975 | Vlert ................................ 180/82 C |
| 3,918,545 | 11/1975 | Andres et al. .................. 180/82 C |
| 3,929,205 | 12/1975 | Takada ............................ 180/82 C |

Primary Examiner—Leonard H. Gerin
Attorney, Agent, or Firm—Brumbaugh, Graves, Donohue & Raymond

[57] ABSTRACT

An apparatus for tensioning a safety belt in response to applied gas pressure makes use of hollow winding roller attached to the safety belt and having a selected contour on its inner surface. A piston in a working cylinder is located coaxially adjacent to the roller. When the piston is displaced by the application of gas pressure it projects into the roller and engages the contouring on the inside surface of the roller to cause the roller to rotate in the direction of belt tightening.

5 Claims, 2 Drawing Figures

APPARATUS FOR TENSIONING A SAFETY BELT

BACKGROUND OF THE INVENTION

This invention relates to apparatus for tensioning safety belts and in particular to such apparatus as are activated by the displacement of a piston in a working cylinder resulting from the application of gas pressure.

Prior art safety belt tightening devices, such as disclosed by Schwanz et al. in U.S. Pat. No. 3,871,470, make use of a piston in a working cylinder which is responsive to applied gas pressure to take up slack in a safety belt in the event of a vehicle accident. Such devices are useful in vehicles which have sensors for detecting the occurence of a vehicle accident. Such sensors may detect a collision by a device projecting from the front of the vehicle, or may respond to a rapid deceleration of the vehicle. Upon the occurrence of a vehicle accident, a signal discharges a pyrotechnic device or applies gas pressure in some other way to cause displacement of the piston. The apparatus disclosed by Schwanz makes use of the motion of the piston to draw the safety belt between a pair of support members thereby taking up slack in the belt. The prior art device additionally include a locking device to prevent reverse motion of the piston in the cylinder after completion of the tensioning movement.

While the prior art device is effective in tensioning a safety belt on the occurrence of an accident, it is usually arranged separate from and in addition to a safety belt winding device, and therefore requires a separate installation operation and takes up additional room within the vehicle.

It is therefore an object of the present invention to provide an apparatus for tensioning a safety belt on the occurrence of an accident, which apparatus is incorporated onto a belt winding device.

It is a further object of the present invention to provide such an apparatus within the smallest possible structure.

SUMMARY OF THE INVENTION

In accordance with the present invention there is provided apparatus for tensioning a safety belt in response to applied gas pressure which includes a hollow winding roller attached to the safety belt and having selected contours on its inner surface. There is further provided a cylinder, coaxially adjacent to the roller and having a piston, arranged in the cylinder and displaceable in response to the gas pressure to project into the roller, act on the contour, and cause rotation of the roller in a safety belt tensioning direction.

In accordance with a preferred embodiment of the invention the contour of the inner surface of the roller comprises helical axial grooves. The piston is non-rotatable in the cylinder by reason of a non-circular cross-section piston rod which passes through a corresponding non-circular opening in the cylinder. The end of the piston rod has a soft metal sheathing for burrowing into the grooves on the inner surface of the roller. For the best results it has been found desirable to have the soft metal sheathing only on the end of the piston rod and to have the outer diameter of the sheathing correspond to the outer diameter of the grooves on the inside surface of the roller.

For a better understanding of the present invention, together with other and further objects, reference is had to the following description, taken up in conjunction with the accompanying drawings, and its scope will be pointed out in the appended claims.

DESCRIPTION OF THE INVENTION

Figure 1:
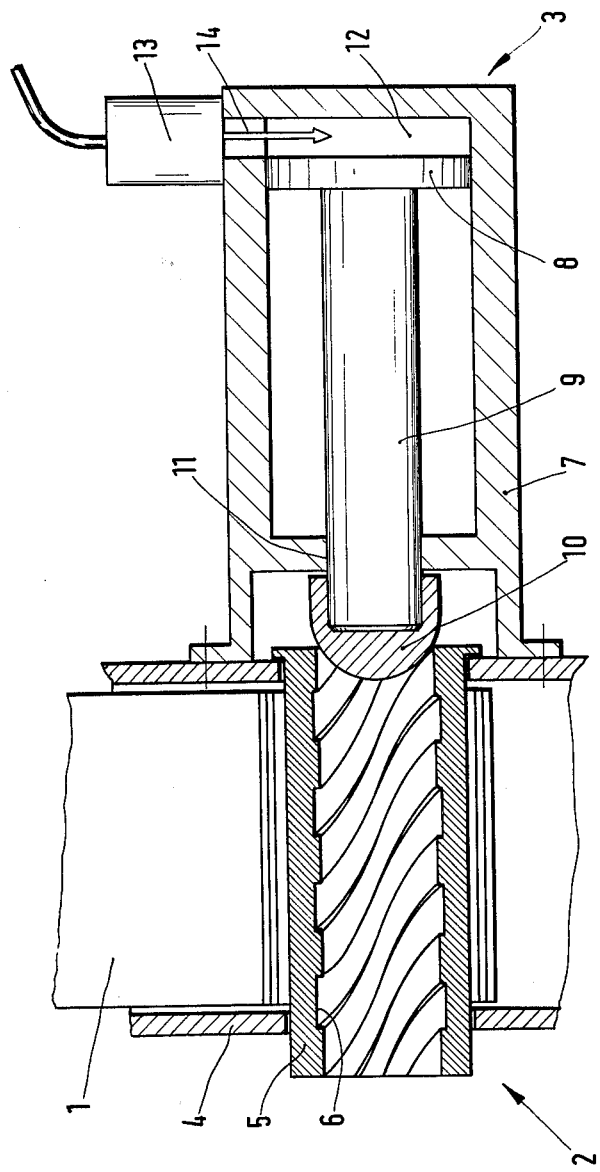
FIG. 1 is a cross-sectional view of a safety belt tensioning apparatus in accordance with the present invention.

FIG. 1 is a cross-sectional view of a safety belt tensioning apparatus in accordance with the present invention. In the FIG. 1 embodiment there is provided a safety belt winding device 2 to which is attached safety belt 1. The winding device 2 includes a housing 4 which is affixed to the frame of the vehicle, and within which is mounted a rotating roller 5 to which the safety belt 1 is affixed. There is provided between roller 5 and housing 4 a winding spring, which is not shown in FIG. 1 drawing. There may also be provided in connection with the roller 5 and housing 4 a locking device which prevents seal belt 1 from unrolling when a large tension is applied to the safety belt 1 on account of rapid decelerations, as occur in the case of a vehicle accident. The winding spring and locking device may be in accordance with the customary design.

Figure 2:
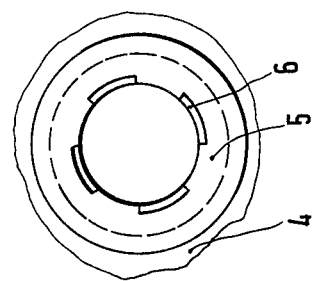
FIG. 2 is a partial end view of the apparatus of FIG. 1 showing the interior grooves of the roller.

In the embodiment of FIG. 1 there is provided a tensioning mechanism 3 which is mounted adjacent to the safety belt take-up device 2. Tensioning mechanism 3 includes cylinder 7 within which is provided a piston 8, having a piston rod 9 arranged coaxially adjacent to hollow roller 5. Cylinder 7 has an inlet opening 14 to which is attached an incendiary device 13. The end of piston rod 9 adjacent to the winding roller 5 is provided with a soft metal sheathing 10. The interior surface of winding roller 5 is provided with a selected contour, in the embodiment of FIG. 1 helical axial grooves 6, also shown in FIG. 2, which have an outer diameter approximately equal to the outer diameter of the soft metal sheathing 10 at the end of piston rod 9. Piston rod 9 is of square or other non-circular cross-section and projects toward the interior of roller 5 through a correspondingly shaped, non-circular opening 11 at the end of cylinder 7 adjacent to winding roller 5.

The safety belt tensioning apparatus of FIG. 1 is used in conjunction with an accident sensing mechanism in the vehicle, which is not shown in the drawing. When the occurrence of an accident is detected, incendiary charge 13 is caused to ignite, thereby applying gas pressure through inlet opening 14 into the working area 12 of cylinder 7. The gas pressure in working area 12 causes piston 8 to be displaced in the direction of winding roller 5, thereby causing piston rod 9 to be projected into the inside of winding roller 5 and causing the soft metal sheathing 10 at the end of piston rod 9 to engage the axial helical grooves 6 on the inside surface of winding roller 5. The engagement of the metal sheathing 10 to the helical axial grooves 6 causes a rotation of roller 5 within frame 4 in a direction corresponding to the tensioning and taking up of safety belt 1. Thereby the direction and number of rotations of roller 5 at a given displacement of piston 8 is determined by the construction of the axial helical grooves 6 on the inner surface of winding roller 5.

Because of the direct action of belt tensioning mechanism 3 on winding roller 5 in accordance with the present invention, it is possible to eliminate the reverse stop locking device normally associated with safety belt tensioning devices. A special reverse locking device for the tensioning apparatus in accordance with the present invention is unnecessary since in the event of an accident the usual roller locking device provides locking of winding roller 5, thereby preventing payout of safety belt 1. As a result of the coaxial and adjacent arrangement of the belt winding device 2 and the belt tensioning mechanism 3, the installation space necessary for the tensioning apparatus becomes comparatively small, and a compact unit comprising tensioning mechanism 3 and winding device 2 can be installed in the vehicle in a single operation.

It is advantageous in case of a safety belt device in accordance with the present invention to provide a belt force limiting device, which is not shown. Such a limiting device will prevent the application of excess force to the body of the vehicle occupant during the restraining operation.

In accordance with the present invention it is additionally possible to provide a belt tensioning device which is separate from the automatically acting safety belt winding device, whereby the piston driven by the propellant gas charge in the manner indicated acts on a second winding roller, provided only for belt tensioning. Thereby a belt force limiting device may be provided by designing the piston rod as a torsion rod, which by means of deformation would effect a limitation on the admissible value of the restraining force in the belt. In such an embodiment it would be necessary to prevent reverse motion of the roller caused by force applied to the safety belt. This can be achieved by using a self locking design for the helical grooves 6 or a reverse stop for piston 8.

While there have been described what are considered to be the preferred embodiments of the invention, those skilled in the art will recognize that other and further modifications may be had thereto without departing from the true spirit and scope of the invention, and it is intended to cover all such embodiments as fall within the true scope of the invention.

I claim:
1. Apparatus for tensioning a safety belt in response to applied gas pressure, comprising:
    a hollow winding roller attached to said safety belt and having helical arial grooves on its inner surface;
    a cylinder, coaxially adjacent to said roller;
    a piston, arranged in said cylinder and displaceable in response to said gas pressure and having a piston rod with a soft metal sheathing to project into said roller, and burrow into said grooves, and to cause rotation of said roller in a safety belt tensioning direction.
2. Apparatus as specified in claim 1 wherein said soft metal sheathing is provided at the end of said piston rod adjacent to said hollow roller.
3. Apparatus as specified in claim 2 wherein the outer diameter of said soft metal sheathing is equal to the outer diameter of said grooves.
4. Apparatus as specified in claim 1 wherein said piston is non-rotatable within said cylinder.
5. Apparatus as specified in claim 4 wherein said piston has a piston rod with a non-circular cross-section, and said piston rod passes through a corresponding non-circular opening in said cylinder.

* * * * *